US012326123B2

(12) United States Patent
Miura

(10) Patent No.: US 12,326,123 B2
(45) Date of Patent: Jun. 10, 2025

(54) COVER MEMBER

(71) Applicant: TOYOTA JIDOSHA KABUSHIKI KAISHA, Toyota (JP)

(72) Inventor: Takeshi Miura, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/811,776

(22) Filed: Aug. 22, 2024

(65) Prior Publication Data

US 2025/0163867 A1 May 22, 2025

(30) Foreign Application Priority Data

Nov. 22, 2023 (JP) ................................. 2023-198239

(51) Int. Cl.
*F02F 7/00* (2006.01)

(52) U.S. Cl.
CPC .................................. *F02F 7/0021* (2013.01)

(58) Field of Classification Search
CPC ..................................................... F02F 7/0021
See application file for complete search history.

(56) References Cited

U.S. PATENT DOCUMENTS 7,316,215 B1 * 1/2008 Nino ...................... F16J 15/062 123/90.38
7,556,002 B2 * 7/2009 Jialanella ............... C08G 59/66 123/90.38

FOREIGN PATENT DOCUMENTS

JP 5214741 B2 6/2013
WO 2009/089242 A2 7/2009

* cited by examiner

*Primary Examiner* — Kevin A Lathers
(74) *Attorney, Agent, or Firm* — SoraIP, Inc.

(57) ABSTRACT

A cover member covering a portion to which a component of an engine is attached includes: a front plate opposed to the portion; a first side plate located at one of both side edges of the front plate and including a first flexible portion protruding outward in the width direction and deflected inward by pressing inward, and a first tab protruding outward from the first flexible portion; a bottom plate located at a bottom edge of the front plate and including a second tab protruding toward the bottom side in the height direction, and a second flexible portion partially protruding toward the bottom side and deflected toward the top side by pressing toward the top side; a first restraining plate located at the top edge of the front plate; and a second side plate located at the other side edge of the front plate and including a second restraining plate.

5 Claims, 7 Drawing Sheets

COVER MEMBER

CROSS-REFERENCE TO RELATED APPLICATION

This application claims priority to Japanese Patent Application No. 2023-198239 filed on Nov. 22, 2023, incorporated herein by reference in its entirety.

BACKGROUND

1. Technical Field

The present disclosure relates to cover members.

2. Description of Related Art

Cover assemblies for attachment to engines without the use of threaded fasteners are known in the art. A cover assembly for snapping attachment to an engine without the use of threaded fasteners includes a cover, clips, etc. (see, for example, Japanese Patent No. 5214741 (JP 5214741 B)).

SUMMARY

In the case where a cover member such as a cover assembly is attached to an engine with clips, a clearance is required to be provided between the cover member and a portion of the engine to which the cover member is attached in order to provide a movable range of the clips during attachment.

When this clearance is large, the holding force of the cover member is reduced. As a result, the cover member may hold less on to the engine and become loose, so that the cover member may come off from the engine. Moreover, foreign matter such as sand and dust may enter inside the cover member through the clearance. On the other hand, when this clearance is small, a worker is required to push the cover member onto the engine with a strong force to attach the cover member to the engine. This may reduce the workability of the worker.

In view of the above, an object of the present disclosure is to provide a cover member having an improved capability to hold on to an engine while reducing a clearance after attachment to the engine.

A cover member according to the present disclosure covers an attachment portion to which a component of an engine is attached. The cover member includes: a front plate facing the attachment portion;

a first side plate located at one of both side edges of the front plate and including a first flexible portion and a first tab, the first flexible portion protruding outward in a width direction of the cover member and configured to be bent inward in the width direction due to first pressing inward in the width direction, and the first tab protruding outward in the width direction from the first flexible portion;

a bottom plate located at a bottom edge of the front plate and including a second tab and a second flexible portion, the second tab protruding toward a bottom side in a height direction of the cover member, and the second flexible portion partially protruding toward the bottom side and configured to be bent toward a top side in the height direction due to second pressing toward the top side;

a first restraining plate located at a top edge of the front plate and configured to restrain, together with the second tab, the cover member from coming off from the engine due to an internal pressure applied to a back surface of the front plate; and a second side plate located at the other of the both side edges of the front plate and including a second restraining plate, the second restraining plate being configured to reduce, together with the first flexible portion, first looseness in the width direction of the cover member, being configured to reduce, together with the second flexible portion, second looseness in the height direction of the cover member, and being configured to restrain, together with the first tab, the cover member from coming off from the engine due to the internal pressure.

In the above configuration, the second restraining plate may be configured to reduce the first looseness by a tilted surface of the second restraining plate being brought into contact with a first surface of a different component different from the component, and may be configured to reduce the second looseness by a top surface of the second restraining plate being brought into contact with a second surface of the different component.

In the above configuration, both the first restraining plate and the second restraining plate may be made of one of a resin and a metal.

Both the first flexible portion and the second flexible portion may be made of the other of the resin and the metal.

When both of the first flexible portion and the second flexible portion are made of the resin, each of the first flexible portion and the second flexible portion may include either a resin clip or a resin latch.

In the above configuration, the cover member may further include a bent drain channel in a bottom portion of the cover member, the drain channel being configured to drain water accumulated between the engine and the cover member from a back side of the cover member to a front side of the cover member.

In the above configuration, the drain channel may include a flow down channel for the water.

The flow down channel may communicate with a vent.

With the present disclosure, it is possible to improve the capability of a cover member to hold on to an engine while reducing a clearance after attachment to the engine.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the present disclosure will be described with reference to the drawings.

Figure 1A:
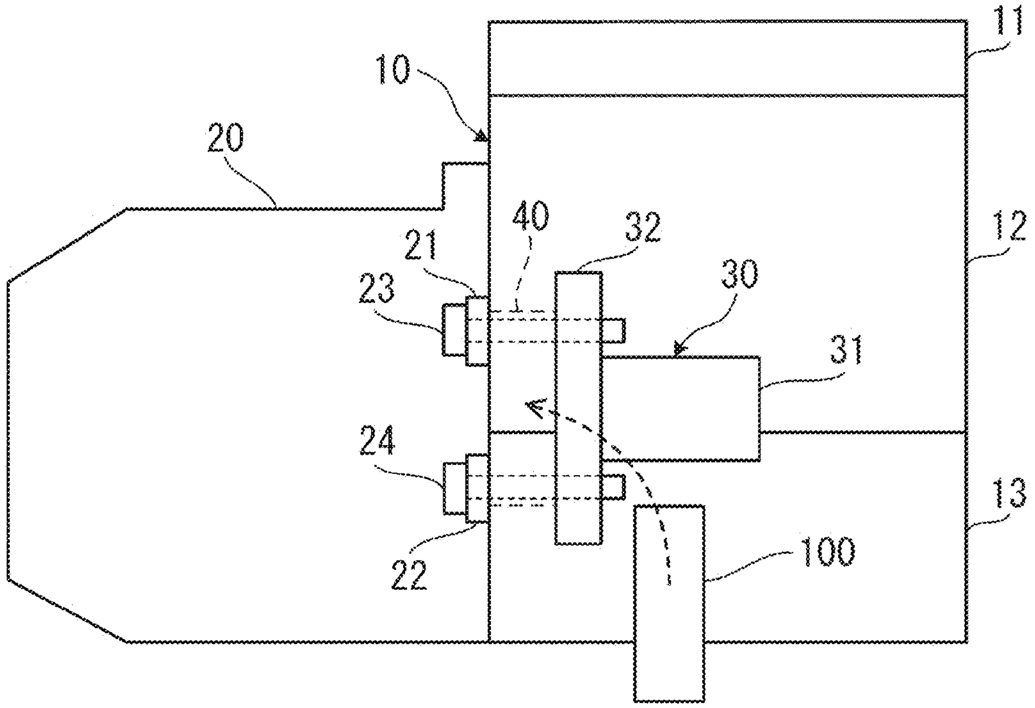
FIG. 1A shows an example of an engine.

As shown in FIG. 1A, the engine 10 includes a cylinder head 11, a cylinder block 12, and an oil pan 13 as components of the engine 10. The engine 10 includes a transmission 20 and a starter 30 as components mounted on the engine 10.

The transmission 20 is disposed behind the engine 10 (specifically, behind the vehicle). The transmission 20 may be arranged on the side of the engine 10 (specifically, on the side of the vehicle). The transmission 20 transmits the torque and the rotational speed from the engine 10 to the tire by increasing or decreasing or reversing the torque and the rotational speed in accordance with the traveling conditions of the vehicle. The starter 30 is disposed, for example, across the outer wall of the cylinder block 12 and the outer wall of the oil pan 13. The starter 30 is powered by a battery (not shown) to start (i.e., crank) the engine 10.

The transmission 20 includes bolt insertion portions 21 and 22 on the outer wall of the transmission 20. A bolt shaft portion of the bolt 23 is inserted into the bolt insertion portion 21. A bolt shaft portion of the bolt 24 is inserted into the bolt insertion portion 22. The starter 30 includes a starter case 31. The starter case 31 has a bottomed cylindrical shape. A starter motor is housed inside the starter case 31. The cylindrical edge of the starter case 31 flange 32 is provided. Two fastening holes for fastening the bolt shafts of the bolts 23, 24 are vertically provided in the flange 32.

The bolt shaft portion of the bolt 23 passes through a through hole provided inside the outer wall of the cylinder block 12 and is fastened by an upper fastening hole provided in the flange 32. The bolt shaft portion of the bolt 24 passes through a through hole provided inside the outer wall of the oil pan 13 and is fastened by a lower fastening hole provided in the flange 32. Thus, the transmission 20 and the starter 30 are integrally attached to the engine 10. More specifically, the transmission 20 and the starter 30 are integrally attached to the engine 10 via the starter mounting portion 40 to which the starter 30 is attached.

The starter mounting portion 40 includes a predetermined space surrounded by the cylinder block 12, the outer wall end portions of the oil pan 13, the bottom surface of the flange 32, and the outer wall end portions of the transmission 20. The two through holes described above are provided behind the starter mounting portion 40.

Figure 1B:
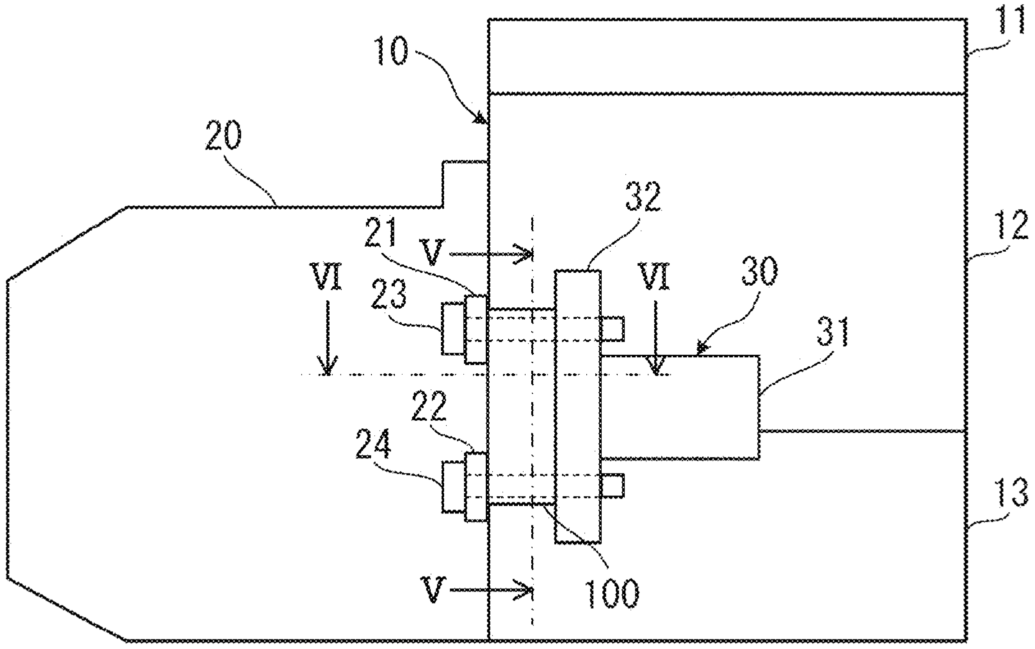
FIG. 1B shows another example of the engine.

Here, when the vehicle travels in a state where the starter mounting portion 40 is exposed, there is a possibility that foreign matters such as sand and dust may be mixed into the cylinder block 12, the oil pan 13, and the transmission 20 during traveling. In order to suppress (desirably prevent) the contamination of such foreign matters, a resin-made cover member 100 covering the starter mounting portion 40 is attached to the engine 10, as shown in FIG. 1B. Contamination of foreign matter should be suppressed as much as possible. Therefore, after the cover member 100 is attached, it is required that the clearance between the cover member 100 and the cylinder block 12, the oil pan 13, and the transmission 20 disposed around the cover member 100 be reduced as much as possible.

A configuration of the cover member 100 will be described with reference to FIGS. 2 to 4.

Figure 2:
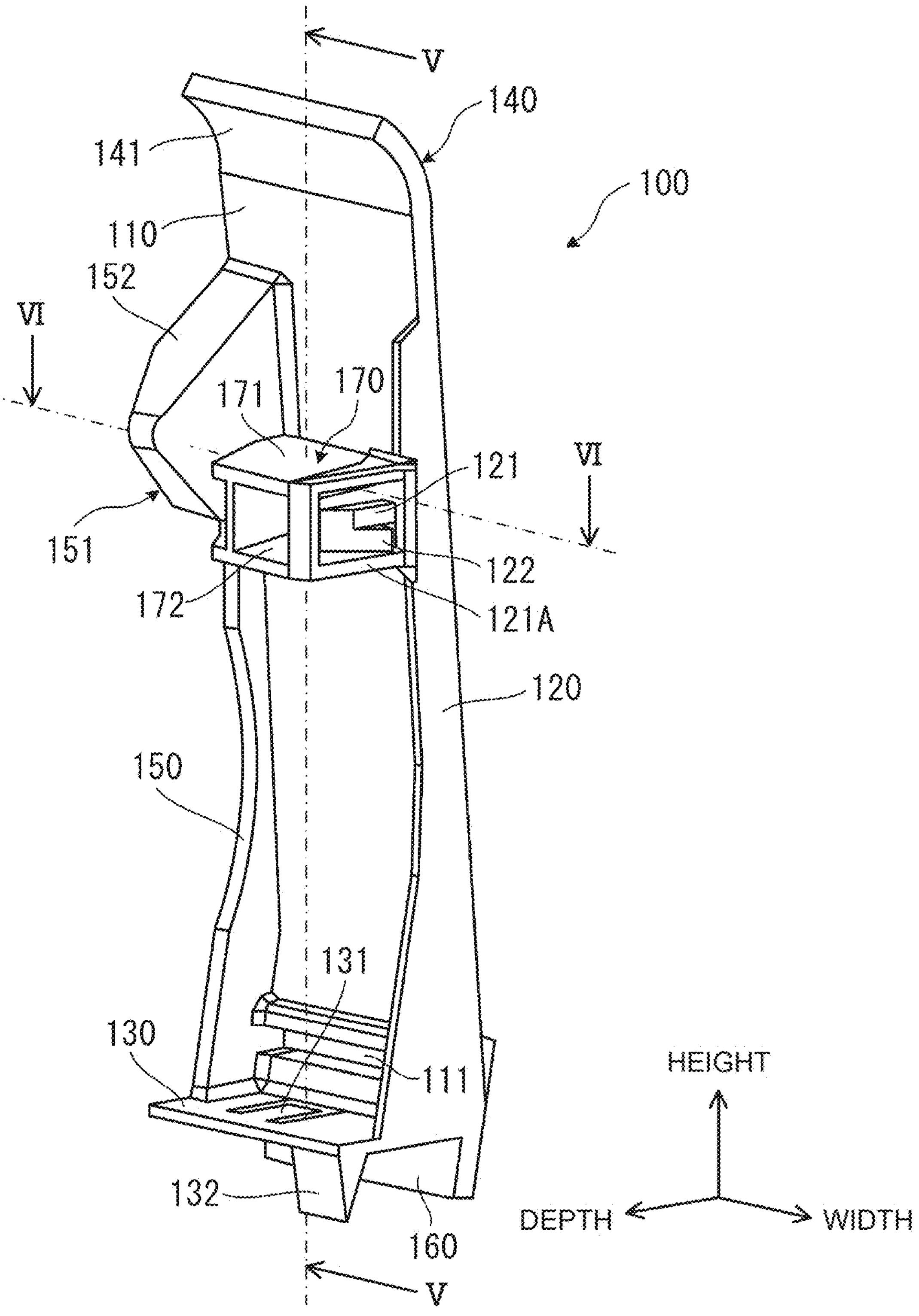
FIG. 2 is an example of a perspective view of a cover member.
Figure 3:
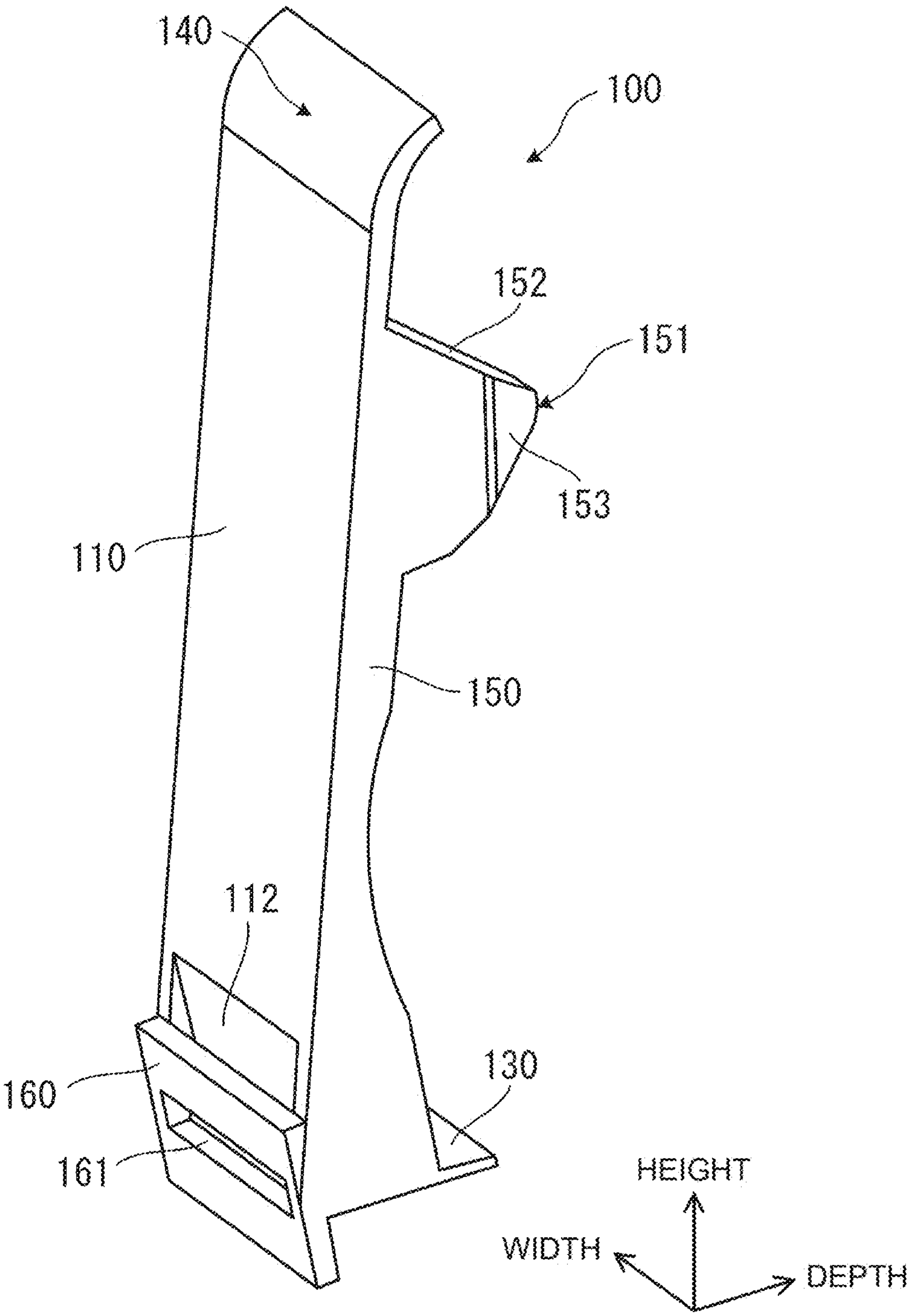
FIG. 3 is another example of the perspective view of the cover member.
Figure 4:
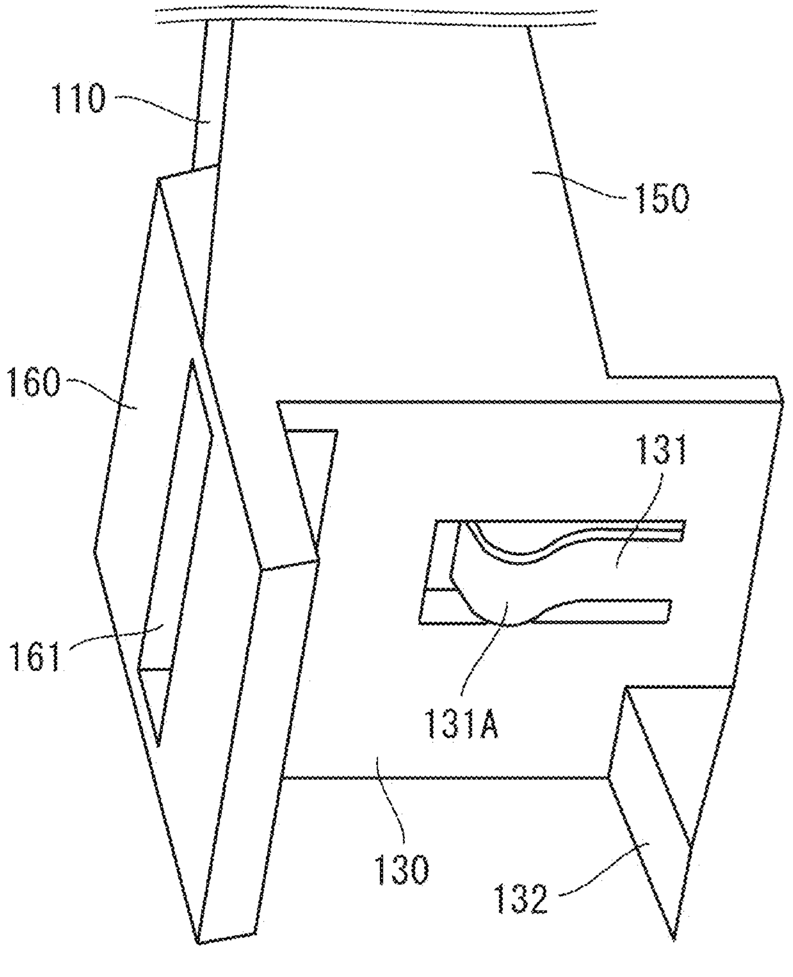
FIG. 4 is an example of a partial perspective view of the cover member.

As shown in FIGS. 2 and 3, the cover member 100 includes a front board 110, a first side board 120, a bottom board 130, a top board 140, and a second side board 150. The front board 110 is an example of a front plate. The first side board 120 is an example of a first side plate. The bottom board 130 is an example of a bottom plate. The top board 140 is an example of a first restraining plate. The second side board 150 is an example of a second side plate. The front board 110 is integrally coupled to the first side board 120, the bottom board 130, the top board 140, and the second side board 150 by resin.

The front board 110 is a flat resin plate that faces the starter mounting portion 40. A first side board 120 is provided on one of both side edges of the front board 110. A bottom board 130 is provided at a bottom edge of the front board 110. The top board 140 is provided on the top edge of the front board 110. A second side board 150 is provided at the other of both side edges of the front board 110. The angle formed by the front board 110 and the bottom board 130 is, for example, an acute angle of 60 degrees to 80 degrees. Thus, for example, when the bottom board 130 is horizontal, the front board 110 is inclined at an acute angle.

The first side board 120 is a resin plate including the first flexible portion 121. The first flexible portion 121 includes a resin clip. The first flexible portion 121 may include a resin latch instead of a resin clip. The first flexible portion 121 is provided above the first side board 120. Specifically, the first flexible portion 121 is provided closer to the top board 140 than the bottom board 130. The first flexible portion 121 is provided inside the U-shaped plastic piece 121A. Both ends of the plastic piece 121A are coupled to an edge portion of the first side board 120.

It should be noted that the plastic clip often includes a clip structure that engages or engages with the clip tip. On the other hand, the resin clip according to the present embodiment is simply pressed and bent without being engaged or engaged with the clip tip. However, even in the clip structure, there is a moment of temporary deflection. Therefore, although the resin clip according to the present embodiment does not include a clip structure, the description of the resin clip is adopted in order to approximate the clip structure in terms of flexibility. The detailed description of the resin latch is omitted for basically the same reason as that of the resin clip.

The shape of the first flexible portion 121 is a right trapezoidal prism. The first flexible portion 121 protrudes outward in the width direction of the cover member 100. The first flexible portion 121 is provided with a first tab 122 protruding outward in the width direction of the cover member 100. That is, the first flexible portion 121 serves as a base of the first tab 122. An edge portion between the bottom surface and the tilted surface of the first flexible portion 121 is connected to the bottom portion of the plastic piece 121A. The tilted surface of the first tab 122 and the tilted surface of the first flexible portion 121 have the same inclination angle. Therefore, the tilted surface of the first tab 122 and the tilted surface of the first flexible portion 121 are flat. The first flexible portion 121 is bent inward in the width direction based on the inward pressing of the cover member 100 in the width direction. Therefore, for example, when the tilted surface of the first tab 122 is pressed inward in the width direction of the cover member 100, the first flexible portion 121 can be bent inward in the width direction of the cover member 100.

The bottom board 130 is a resin plate including a second flexible portion 131 and a second tab 132. The second flexible portion 131 includes one of a resin clip and a resin latch. As illustrated in FIG. 4, the second flexible portion 131 partially protrudes toward the bottom side in the height direction of the cover member 100, and bends toward the top side on the basis of pressing toward the top side in the height direction. For example, as shown in FIG. 4, when the protruding piece 131A of the second flexible portion 131 is pressed toward the top side in the height direction of the cover member 100, the second flexible portion 131 can be bent toward the top side of the cover member 100. The second tab 132 is a triangular prism protruding toward the bottom side in the height direction of the cover member 100.

As shown in FIGS. 2 and 3, the top board 140 is a curved resin plate including a curved surface 141. As will be described in detail later, the top board 140 together with the second tab 132 restrains the cover member 100 from coming off from the engine 10 due to the internal pressure applied to the back surface of the front board 110.

The second side board 150 is a resin plate including the guide board 151. The guide board 151 is an example of a second restraining plate. The guide board 151 is provided above the second side board 150. Specifically, the guide board 151 is provided closer to the top board 140 than the bottom board 130. The guide board 151 has a thickness that is greater than the thickness of the second side board 150. The guide board 151 guides attachment of the cover member 100 to the engine 10.

The guide board 151 has a guide top surface 152 and a guide tilted surface 153. Although details will be described later, the guide board 151 together with the first flexible portion 121 reduces looseness in the width direction of the cover member 100. The guide board 151 together with the second flexible portion 131 reduces looseness in the height direction of the cover member 100. Furthermore, the guide board 151 together with the first tab 122 restrains the cover member 100 from coming off from the engine 10 due to the internal pressure applied to the back surface of the front board 110.

The cover member 100 includes a mini board 160 between the surface of the front board 110 and the bottom surface of the bottom board 130. That is, the mini board 160 is provided at the bottom of the cover member 100. The mini board 160 is a flat resin plate. The mini board 160 is integrally coupled to either or both of the front board 110 and the bottom board 130. The lower end portion of the mini board 160 protrudes in the direction of the bottom side of the bottom board 130 to the same extent as the second tab 132.

The mini board 160 is provided at the bottom of the cover member 100 at an angle different from the acute angle described above. For example, the angle formed between the back surface of the mini board 160 and the bottom surface of the bottom board 130 is an acute angle. Therefore, the angle formed between the front surface (or back surface) of the mini board 160 and the top surface of the bottom board 130 is an obtuse angle. For example, an angle formed between the front surface (or back surface) of the mini board 160 and the front surface of the front board 110 is an acute angle smaller than the acute angle described above, such as about 15 degrees to 30 degrees.

As shown in FIG. 3, the mini board 160 includes a discharge port 161 for discharging water accumulated in the starter mounting portion 40. The starter mounting portion 40 is located between the outer wall of the engine 10 and the cover member 100, but when the vehicle is an off-road vehicle traveling on a bad road or a river including a water pool, water may accumulate during this period. Even in an on-road vehicle in which a vehicle travels on a pavement road, if there is a water pool in the pavement road, water may accumulate in the pavement road. Such water includes, for example, muddy water and rainwater.

Therefore, as shown in FIG. 2, the bottom of the front board 110 is provided with a water introduction port 111 connected to the discharge port 161. As will be described in detail later, as shown in FIG. 3, a vent 112 is provided on a surface of a bottom portion of the front board 110 in order to promote discharge of water and support smooth discharge. As a result, water accumulated between the outer wall of the engine 10 and the back surface of the cover member 100 is drained from the rear side of the cover member 100 to the front side of the cover member 100.

Note that, as shown in FIG. 2, in the present embodiment, the cover member 100 includes the strength member 170 that is coupled to the U-shaped resin piece 121A, but the cover member 100 may not include the strength member 170. The strength member 170 is provided on the back surface of the front board 110, and is disposed, for example, on the side of the first flexible portion 121 or between the first flexible portion 121 and the guide board 151. The strength member 170 includes an upper plate 171 and a lower plate 172 arranged in parallel with each other. By providing the strength member 170 in the cover member 100, the strength of the portion of the front board 110 where the strength member 170 is provided is improved. As a result, temporary deformation of the cover member 100 when the cover member 100 is attached to the engine 10 is suppressed, and workability is improved.

Next, the operation of the cover member 100 will be described with reference to FIGS. 5 to 7.

Figure 5:
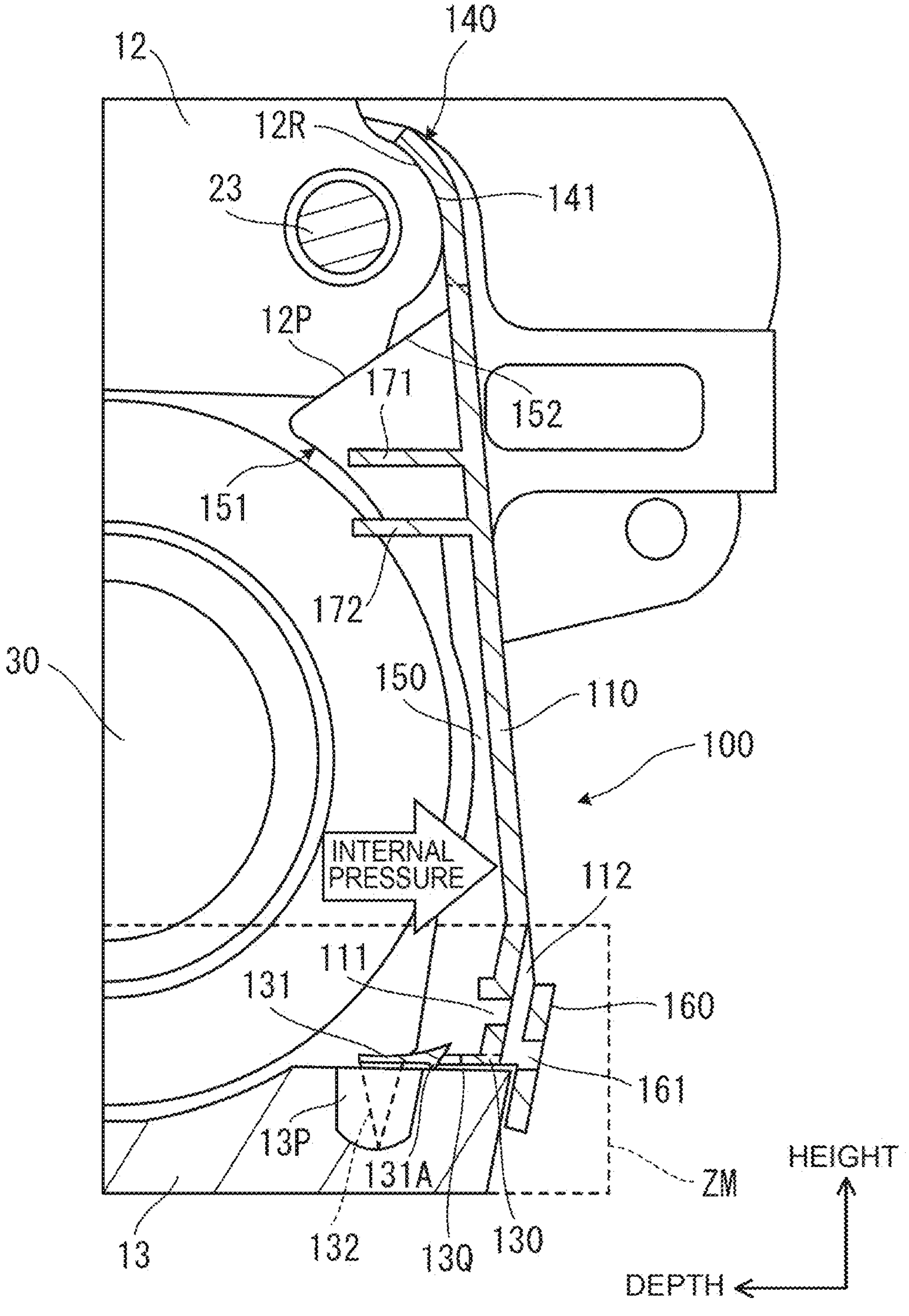
FIG. 5 shows an example of a V-V partial sectional view of the engine after attachment of the cover member.

When the cover member 100 is attached to the engine 10, as shown in FIG. 5, first, the second tab 132 provided on the bottom board 130 is independently inserted into the groove 13P provided inside the outer wall of the oil pan 13. Next, with the second tab 132 inserted, the top board 140 is pushed in the direction of the cylinder block 12 with the second tab 132 as a rotation center axis. Accordingly, the cover member 100 is attached to the engine 10.

When the cover member 100 is attached, the protruding piece 131A of the second flexible portion 131 comes into contact with the inner wall surface 13Q of the oil pan 13 in a strong interfering manner, and thereby bends toward the top of the cover member 100. Accordingly, the cover member 100 is pushed up. On the other hand, the guide top surface 152 of the guide board 151 abuts on and comes into close contact with the inner wall surface 12P of the cylinder block 12 when the cover member 100 is pushed up. Since both the guide top surface 152 and the inner wall surface 12P of the cylinder block 12 are flat surfaces, the guide top surface 152 is in close contact with the inner wall surface 12P. As described above, the cover member 100 is pushed up by the second flexible portion 131, and the inner wall surface 12P of the cylinder block 12 is brought into close contact with the guide top surface 152, so that looseness in the height direction of the cover member 100 is reduced. That is, the holding capability of the cover member 100 in the height direction is supported by the guide board 151. In this way, the holding capability of the cover member 100 is improved.

Figure 6:
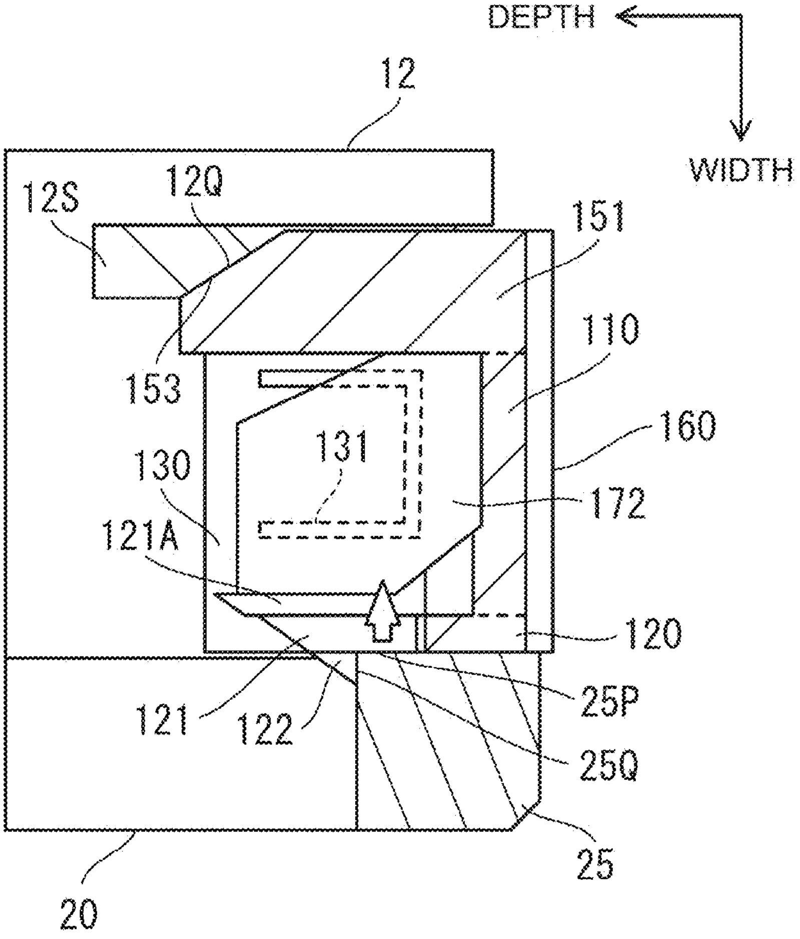
FIG. 6 shows an example of the VI-VI partial sectional view of the engine after attachment of the cover member.
Figure 7:
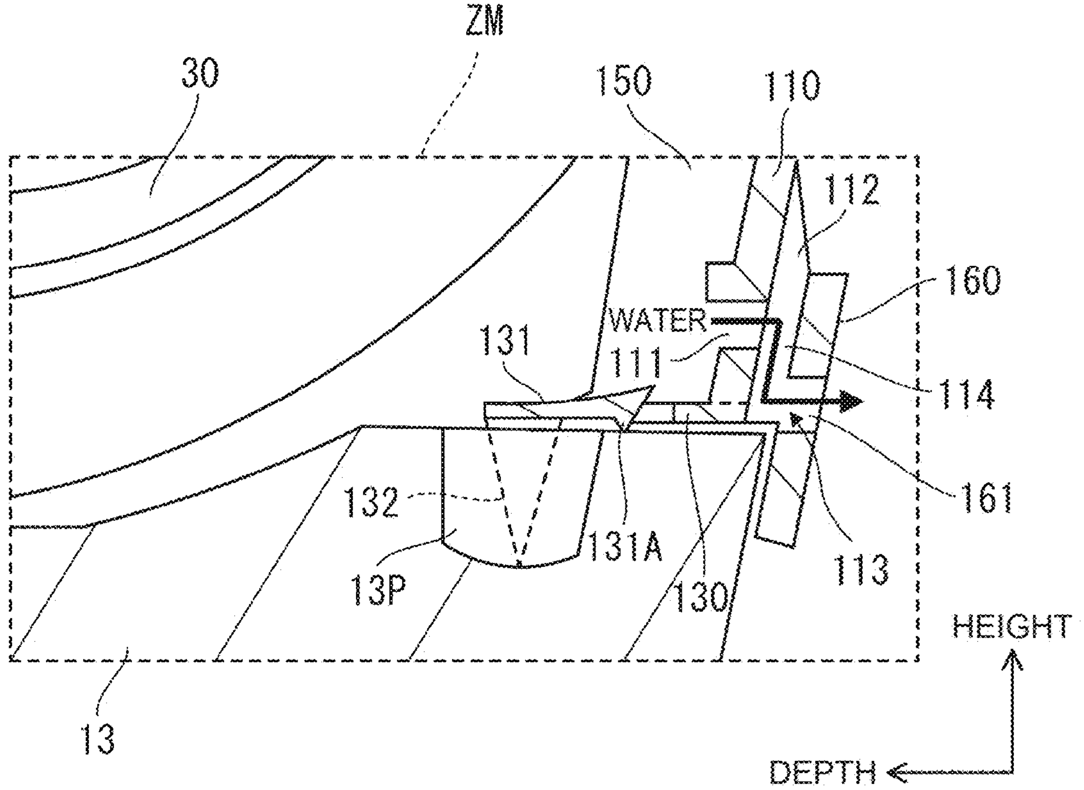
FIG. 7 shows an example of an enlarged view of the V-V partial sectional view.

Further, when the cover member 100 is attached, as shown in FIG. 6, the first flexible portion 121 comes into contact with the end surface 25P of the outer wall 25 of the transmission 20 in a strong interfering manner, and thereby bends to the widthwise inner side of the cover member 100. Accordingly, the cover member 100 is pushed in the direction of the engine 10. On the other hand, the guide tilted surface 153 of the guide board 151 abuts on and comes into close contact with the inner wall surface 12Q of the inner wall 12S of the cylinder block 12 when the cover member 100 is pushed in. Since both the guide tilted surface 153 and the inner wall surface 12Q are flat surfaces, the guide tilted surface 153 is in close contact with the inner wall surface 12Q. As described above, the cover member 100 is pushed by the first flexible portion 121, and the inner wall surface 12Q of the inner wall 12S of the cylinder block 12 and the guide tilted surface 153 come into close contact with each other, so that looseness in the width direction of the cover member 100 is reduced. That is, the holding capability of the cover member 100 in the width direction is supported by the guide board 151.

In this way, the holding capability of the cover member 100 is improved. As a result, the clearance between the cover member 100 and the cylinder block 12 is reduced, and the foreign matter is prevented from entering the inside of the cover member 100. Further, even if the clearance is reduced, the inclination of the guide tilted surface 153 guides the attachment of the cover member 100 to the engine 10. This ensures smooth attachment of the cover member 100.

Here, as shown in FIG. 5, an internal pressure acts on the back surface of the front board 110. The internal pressure is a water pressure caused by water such as muddy water and rainwater described above. As a result, the cover member 100 may come off from the engine 10. For example, as shown in FIG. 6, there is a possibility that the guide board 151 side is disengaged while rotating with the first tab 122 as a rotation center axis. If the second tab 132 is not provided, as shown in FIG. 5, there is a possibility that the top board 140 may be disengaged while rotating to the front side of the front board 110 with a portion of the front board 110 having a high internal pressure as a rotation center axis. In addition, depending on a portion of the front board 110 where the internal pressure is high, the bottom portion of the cover member 100 may come off from the oil pan 13.

In order to avoid such coming off, not only the first tab 122 is caught by the inner wall surface 25Q of the outer wall 25 of the transmission 20, but also the guiding tilted surface 123 is brought into close contact with the inner wall surface 12Q of the inner wall 12S of the cylinder block 12. As a result, the rotation of the first tab 122 as the rotation center axis is inhibited, so that the cover member 100 is restrained from coming off from the engine 10.

Further, not only the second tab 132 is inserted into the groove 13P of the oil pan 13, but also the curved surface 141 of the top board 140 is brought into close contact with the curved surface 12R of the cylinder block 12 while the front board 110 is inclined. Accordingly, even if a portion of the front board 110 having a high internal pressure serves as the rotation center axis, the cover member 100 is restrained from coming off from the top board 140 or from the bottom of the cover member 100.

The drainage from the cover member 100 will be described with reference to FIG. 7. Note that the enlarged partial ZM illustrated in FIG. 7 corresponds to the enlarged partial ZM illustrated in FIG. 5.

The water accumulated on the back side of the cover member 100 is discharged from the water introduction port 111 through the drain channel 113 through the discharge port 161. That is, the water accumulated between the outer wall of the engine 10 and the cover member 100 is drained from the back side of the cover member 100 to the front side of the cover member 100. The drain channel 113 is bent in a labyrinth structure including, for example, a Z-shape. Therefore, the water introduced into the drain channel 113 due to vibration of the vehicle or the like collides with the back surface of the mini board 160, is forcibly cranked, and is directed toward the discharge port 161. Since the discharge port 161 has such a bent structure, entry of foreign matter through the discharge port 161 is reduced. Note that the discharge port 161 may be a hole or a slit.

As described above, the water pressure caused by the water acts as the internal pressure on the back surface of the front board. In order to relieve such internal pressure, the upper end of the water flow down channel 114 of the drain channel 113 communicates with the vent 112. Since the cover member 100 has such a structure, the discharge of water is promoted and the water is smoothly discharged.

Although the preferred embodiment of the disclosure is described above in detail, the disclosure is not limited to the specific embodiment, and various modifications and changes may be made within the scope of the disclosure described in claims.

For example, in the present embodiment, the cover member 100 that covers the starter mounting portion 40 has been described as an example, but the present disclosure is not limited to such a cover member 100, and the gist of the present disclosure may be adopted for various cover members. For example, the present disclosure may be applied to a plastic cap, a noise vibration (NV) cover, a wire harness cover, a service hole cover, or the like of a cast part such as an engine mount.

Further, in the present embodiment, the cover member 100 made of resin has been described as an example, but a metal may be adopted as a part of the cover member 100. For example, both the top board 140 and the guide board 151 may be made of resin or metal, and both the first flexible portion 121 and the second flexible portion 131 may be made of resin or metal. Because both the top board 140 and the guide board 151 have different strengths from both the first flexible portion 121 and the second flexible portion 131, the holding capability of the cover member 100 may be improved.

What is claimed is:

1. A cover member that covers an attachment portion to which a component of an engine is attached, the cover member comprising:

a front plate facing the attachment portion;

a first side plate located at one of both side edges of the front plate and including a first flexible portion and a first tab, the first flexible portion protruding outward in a width direction of the cover member and configured to be bent inward in the width direction due to first pressing inward in the width direction, and the first tab protruding outward in the width direction from the first flexible portion;

a bottom plate located at a bottom edge of the front plate and including a second tab and a second flexible portion, the second tab protruding toward a bottom side in a height direction of the cover member, and the second flexible portion partially protruding toward the bottom side and configured to be bent toward a top side in the height direction due to second pressing toward the top side;

a first restraining plate located at a top edge of the front plate and configured to restrain, together with the second tab, the cover member from coming off from the engine due to an internal pressure applied to a back surface of the front plate; and a second side plate located at the other of the both side edges of the front plate and including a second restraining plate, the second restraining plate being configured to reduce, together with the first flexible portion, first looseness in the width direction of the cover member, being configured to reduce, together with the second flexible portion, second looseness in the height direction of the cover member, and being configured to restrain, together with the first tab, the cover member from coming off from the engine due to the internal pressure.

2. The cover member according to claim 1, wherein the second restraining plate is configured to reduce the first looseness by a tilted surface of the second restraining plate being brought into contact with a first surface of a different component different from the component, and is configured to reduce the second looseness by a top surface of the second restraining plate being brought into contact with a second surface of the different component.

3. The cover member according to claim 1, wherein:

both the first restraining plate and the second restraining plate are made of one of a resin and a metal;

both the first flexible portion and the second flexible portion are made of the other of the resin and the metal; and when both of the first flexible portion and the second flexible portion are made of the resin, each of the first flexible portion and the second flexible portion includes either a resin clip or a resin latch.

4. The cover member according to claim 1, further comprising a bent drain channel in a bottom portion of the cover member, the drain channel being configured to drain water accumulated between the engine and the cover member from a back side of the cover member to a front side of the cover member.

5. The cover member according to claim 4, wherein the drain channel includes a flow down channel for the water, and the flow down channel communicates with a vent.

* * * * *